(12) United States Patent
Biswas et al.

(10) Patent No.: US 12,067,337 B2
(45) Date of Patent: Aug. 20, 2024

(54) POWER GRID, IC AND METHOD FOR PLACING POWER GRID

(71) Applicant: Taiwan Semiconductor Manufacturing Company, Ltd., Hsinchu (TW)

(72) Inventors: Hiranmay Biswas, Maslandapur (IN); Kuo-Nan Yang, Hsinchu (TW); Chung-Hsing Wang, Baoshan Township, Hsinchu County (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 493 days.

(21) Appl. No.: 17/377,635

(22) Filed: Jul. 16, 2021

(65) Prior Publication Data
US 2021/0342515 A1 Nov. 4, 2021

Related U.S. Application Data

(63) Continuation of application No. 16/875,060, filed on May 15, 2020, now Pat. No. 11,068,638, which is a
(Continued)

(51) Int. Cl.
*G06F 30/392* (2020.01)
*G06F 30/394* (2020.01)
(Continued)

(52) U.S. Cl.
CPC .......... *G06F 30/392* (2020.01); *G06F 30/394* (2020.01); *H01L 23/50* (2013.01);
(Continued)

(58) Field of Classification Search
CPC .................................................. G06F 30/392
(Continued)

(56) References Cited

U.S. PATENT DOCUMENTS 5,283,753 A * 2/1994 Schucker ............ H01L 27/0207
716/120
7,240,314 B1 * 7/2007 Leung ................. H01L 23/5286
716/120
(Continued)

OTHER PUBLICATIONS

Chinese office action dated Aug. 25, 2020, issued in application No. 201710840586.6.

*Primary Examiner* — Eric D Lee
(74) *Attorney, Agent, or Firm* — McClure, Qualey & Rodack, LLP

(57) ABSTRACT

Power grid of an integrated circuit (IC) is provided. A plurality of first power lines are formed in a first metal layer. A plurality of second power lines are formed in the first metal layer and parallel to the first power lines, and the first and second power lines are interlaced in the first metal layer. A plurality of third power lines formed in a second metal layer, and the third power lines are perpendicular to the first power lines. A plurality of fourth power lines are formed in the second metal layer and parallel to the third power lines, and the third and fourth power lines are interlaced in the second metal layer. Distances from each of the third power lines to two adjacent fourth power lines are different, and distances from each of the fourth power lines to two adjacent third power lines are the same.

20 Claims, 7 Drawing Sheets

Related U.S. Application Data continuation of application No. 15/651,165, filed on Jul. 17, 2017, now Pat. No. 10,672,709.

(60) Provisional application No. 62/432,731, filed on Dec. 12, 2016.

(51) Int. Cl.
  *H01L 23/50* (2006.01)
  *H01L 23/522* (2006.01)
  *H01L 23/528* (2006.01)
  *G06F 113/04* (2020.01)
  *G06F 119/06* (2020.01)

(52) U.S. Cl.
  CPC ........ *H01L 23/5226* (2013.01); *H01L 23/528* (2013.01); *H01L 23/5286* (2013.01); *G06F 2113/04* (2020.01); *G06F 2119/06* (2020.01)

(58) Field of Classification Search
  USPC ........................................................ 716/127
  See application file for complete search history.

(56) References Cited

U.S. PATENT DOCUMENTS

| | | | |
|---|---|---|---|
| 7,279,926 B2 * | 10/2007 | Severson | H03K 19/0016 |
| | | | 257/393 |
| 2011/0304052 A1 | 12/2011 | Turner et al. | |
| 2014/0175662 A1 | 6/2014 | Yang | |
| 2014/0264924 A1 | 9/2014 | Yu et al. | |
| 2015/0370953 A1 * | 12/2015 | Frederick, Jr. | G06F 30/398 |
| | | | 716/130 |

* cited by examiner

POWER GRID, IC AND METHOD FOR PLACING POWER GRID

CROSS REFERENCE TO RELATED APPLICATIONS

This Application is a Continuation of U.S. application Ser. No. 16/875,060, filed on May 15, 2020, now U.S. Pat. No. 11,068,638, which is a Continuation of U.S. application Ser. No. 15/651,165, filed on Jul. 17, 2017, now U.S. Pat. No. 10,672,709, which claims priority of U.S. Provisional Application No. 62/432,731, filed on Dec. 12, 2016, the entirety of which are incorporated by reference herein.

BACKGROUND

In integrated circuit (IC) design, a power grid is used to deliver power and ground to transistors as efficiently as possible. The power grid is a power distribution network. In general, a power distribution network should have minimal voltage variation and a high current-carrying capability. For example, if the voltage variation caused by the power grid is increased, the signal strength of the delivered power is decreased, and IR drop is present. Thus, the components (e.g. standard cells or transistors) of the IC cannot work normally, experiencing such problems as function failure, or a reduction of operating speed.

The power grid is formed by using a large amount of metal lines. Electromigration (EM) has long been a problem in power grids used in the semiconductor industry. As electrons pass through a conductor (e.g. a metal wire/line), they tend to drag the metallic ions of the conductor along with them through electrostatic attraction. This results in a slight concentration gradient in the direction of electron flow which in turn sets up an opposing diffusion gradient, so-called back pressure, that tends to move ions towards regions of lower density. If current flows long enough at a sufficiently high current density, the 'electron wind' effect dominates and vacancies form which eventually lead to voids and, finally, open circuits, thereby decreasing the reliability of chips.

Therefore, a power grid is important for cell placement in IC design.

BRIEF DESCRIPTION OF THE DRAWINGS

Aspects of the present disclosure are best understood from the following detailed description when read with the accompanying figures. It should be noted that, in accordance with the standard practice in the industry, various nodes are not drawn to scale. In fact, the dimensions of the various nodes may be arbitrarily increased or reduced for clarity of discussion.

DETAILED DESCRIPTION

Figure 1:
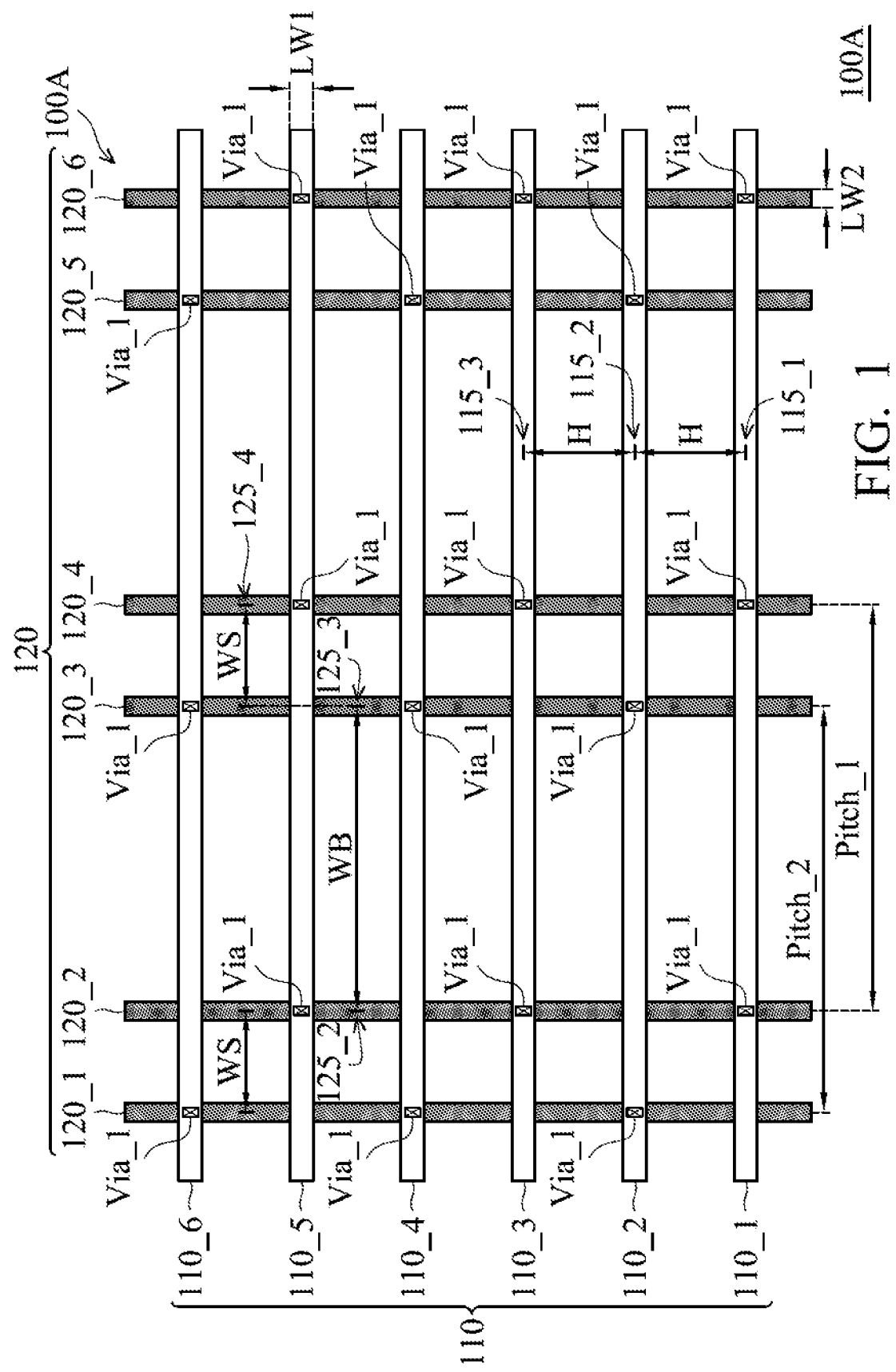
FIG. 1 shows a power grid of an integrated circuit (IC), in accordance with some embodiments of the disclosure.

The following disclosure provides many different embodiments, or examples, for implementing different nodes of the subject matter provided. Specific examples of components and arrangements are described below to simplify the present disclosure. These are, of course, merely examples and are not intended to be limiting. In some embodiments, the formation of a first node over or on a second node in the description that follows may include embodiments in which the first and second nodes are formed in direct contact, and may also include embodiments in which additional nodes may be formed between the first and second nodes, such that the first and second nodes may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Some variations of the embodiments are described. Throughout the various views and illustrative embodiments, like reference numbers are used to designate like elements. It should be understood that additional operations can be provided before, during, and/or after a disclosed method, and some of the operations described can be replaced or eliminated for other embodiments of the method.

FIG. 1 shows a power grid 100A of an integrated circuit (IC), in accordance with some embodiments of the disclosure. The power grid 100A is a non-uniform power delivery structure capable of delivering a supply voltage (VDD) and a grounding voltage (VSS) to multiple standard cells (or memory cells, logic cells, etc.) below the power grid 100A throughout the IC.

Multiple power lines (or traces) 120 are disposed in a metal layer Mn, and multiple power lines 110 are disposed in a metal layer $M_{n+1}$. In some embodiments, half of the power lines 110 are used to deliver a first power, such as a supply voltage (e.g. VDD), and the other half of the power lines 110 are used to deliver a second power, such as a grounding power (e.g. VSS). Similarly, half of the power lines 120 are used to deliver the first power (e.g. VDD), and the other half of the power lines 120 are used to deliver the second power (e.g. VSS).

In FIG. 1, the metal layer $M_{n+1}$ is disposed on the metal layer $M_n$. For example, the metal layer $M_{n+1}$ is an upper metal layer, and the metal layer $M_n$ is a lower metal layer. In some embodiments, the metal layer $M_n$ is disposed on the metal layer $M_{n+1}$, e.g. the metal layer $M_n$ is an upper metal layer, and the metal layer $M_{n+1}$ is a lower metal layer.

The power lines 110 are the metal lines arranged parallel to a horizontal direction, e.g. the power lines 110 are arranged in rows. The power lines 110 capable of delivering the first power and the power lines 110 capable of delivering the second power are alternately arranged in the metal layer $M_{n+1}$. Specifically, the power line of the first power is disposed between two adjacent power lines of the second power, and the power line of the second power is disposed between two adjacent power lines of the first power. For example, assuming that the power lines 110_1, 110_3 and 110_5 are used to deliver the first power and the power lines 110_2, 110_4 and 110_6 are used to deliver the second power, the power line 110_2 of the second power is disposed between the power lines 110_1 and 110_3 of the first power, and the power line 110_3 of the first power is disposed between the power lines 110_2 and 110_4 of the second power.

The power lines 120 are the metal lines arranged parallel to a vertical direction, e.g. the power lines 120 are arranged in columns. The power lines 120 capable of delivering the first power and the power lines 120 capable of delivering the second power are also alternately arranged in the metal layer $M_n$, i.e. the power lines 120 capable of delivering the first power and the power lines 120 capable of delivering the second power are interlaced. For example, assuming that the power lines 120_1, 120_3 and 120_5 are used to deliver the second power and the power lines 120_2, 120_4 and 120_6 are used to deliver the first power, the power line 120_2 of the first power is disposed between the power lines 120_1 and 120_3 of the second power, and the power line 120_3 of the second power is disposed between the power lines 120_2 and 120_4 of the first power.

Multiple vias Via_1 are coupled between the power lines 110 and 120, and the vias Via_1 are arranged between the metal layers $M_{n+1}$ and $M_n$. The power lines 110 and 120 capable of delivering the same power are coupled via the corresponding vias Via_1. For the first power, the power lines 110_1, 110_3 and 110_5 are coupled to the power lines 120_2, 120_4 and 120_6 via the corresponding vias Via_1, and the first power is provided to the standard cells of the IC via the power lines 110_1, 110_3, 110_5, 120_2, 120_4 and 120_6. For the second power, the power lines 110_2, 110_4 and 110_6 are coupled to the power lines 120_1, 120_3 and 120_5 via the corresponding vias Via_1, and the second power is provided to the standard cells of the IC via the power lines 110_2, 110_4, 110_6, 120_1, 120_3 and 120_5.

In some embodiments, the power lines 110_1, 110_3 and 110_5 are coupled to the power lines 120_1, 120_3 and 120_5 via the corresponding vias Via_1, and the first power is provided to the standard cells of the IC via the power lines 110_1, 110_3, 110_5, 120_1, 120_3 and 120_5. Furthermore, the power lines 110_2, 110_4 and 110_6 are coupled to the power lines 120_2, 120_4 and 120_6 via the corresponding vias Via_1, and the second power is provided to the standard cells of the IC via the power lines 110_2, 110_4, 110_6, 120_2, 120_4 and 120_6.

In some embodiments, the first power is a supply voltage (e.g. VDD), and the second power is a grounding power (e.g. VSS). In some embodiments, the first power is a grounding power (e.g. VSS), and the second power is a supply voltage (e.g. VDD).

The power lines 110 have the same line width LW1. Furthermore, the distances from the center (e.g. in the half line width LW1) of each power line 110 to the centers of the two adjacent power lines 110 are the same. For example, the distance from the center (label as 115_2) of the power line 110_2 to the center (label as 115_1) of the power line 110_1 and the distance from the center (label as 115_2) of the power line 110_2 to the center (label as 115_3) of the power line 110_3 are both equal to H, i.e. the power line 110_2 is equidistant from the power lines 110_1 and 110_3. In some embodiments, H represents the height of the standard cells to be arranged (or placed) in the zones of the power grid 100A. The placements of the standard cells will be described in detail below.

The power lines 120 have the same line width LW2. Furthermore, the distances from the center (e.g. in the half line width LW2) of each power line 120 to the centers of the two adjacent power lines 120 are different. For example, the distance from the center (label as 125_3) of the power line 120_3 to the center (label as 125_2) of the power line 120_2 is WB, and the distance from the center (label as 125_3) of the power line 120_3 to the center (label as 125_4) of the power line 120_4 is WS. In some embodiments, WB is proportional to WS.

In the power grid 100A, a power pitch is the maximum allowable distance between two adjacent power lines. For the power lines 110, the power pitch between the two adjacent power lines of different power is H. For example, the power pitch between the power line 110_2 of the second power and the power line 110_1 of the first power is H, and the power pitch between the power line 110_2 of the second power and the power line 110_3 of the first power is also H. Furthermore, the power pitch between the two adjacent power lines 110 of the same power is 2H. For example, the power pitch between the power lines 110_1 and 110_3 of the first power is 2H, and the power pitch between the power lines 110_2 and 110_4 of the second power is also 2H. Specifically, the power pitches of the power lines 110 are the same.

For the power lines 120, the power pitch between the two adjacent power lines of different power may be WB or WS. For example, the power pitch between the power line 120_3 of the second power and the power line 120_2 of the first power is WB, and the power pitch between the power line 120_3 of the second power and the power line 120_4 of the first power is WS. Moreover, the power pitch between the power line 120_2 of the first power and the power line 120_1 of the second power is WS. Specifically, the distances from each power line 120 of one power to the two adjacent power lines of the other power are different. In the power grid 100A, the power pitches of the two adjacent power lines 120 of the same power are the same. For example, the power pitch between the power lines 120_1 and 120_3 of the second power is Pitch_2, and the power pitch Pitch_2 is the sum of WS and WB, i.e. Pitch_2=WS+WB.

Furthermore, the power pitch between the power lines 120_2 and 120_4 of the first power is Pitch_1, and the power pitch Pitch_1 is the sum of WB and WS, i.e. Pitch_1=WB+WS=Pitch_2.

In the power grid 100A, the metal lines 110 and 120 formed in the metal layers $M_n$ and $M_{n+1}$ are used as an example, and are not intended to limit the disclosure. In some embodiments, the power grid 100A is formed by more metal layers. Furthermore, the power grid 100A can periodically be implemented in the IC.

Figure 2:
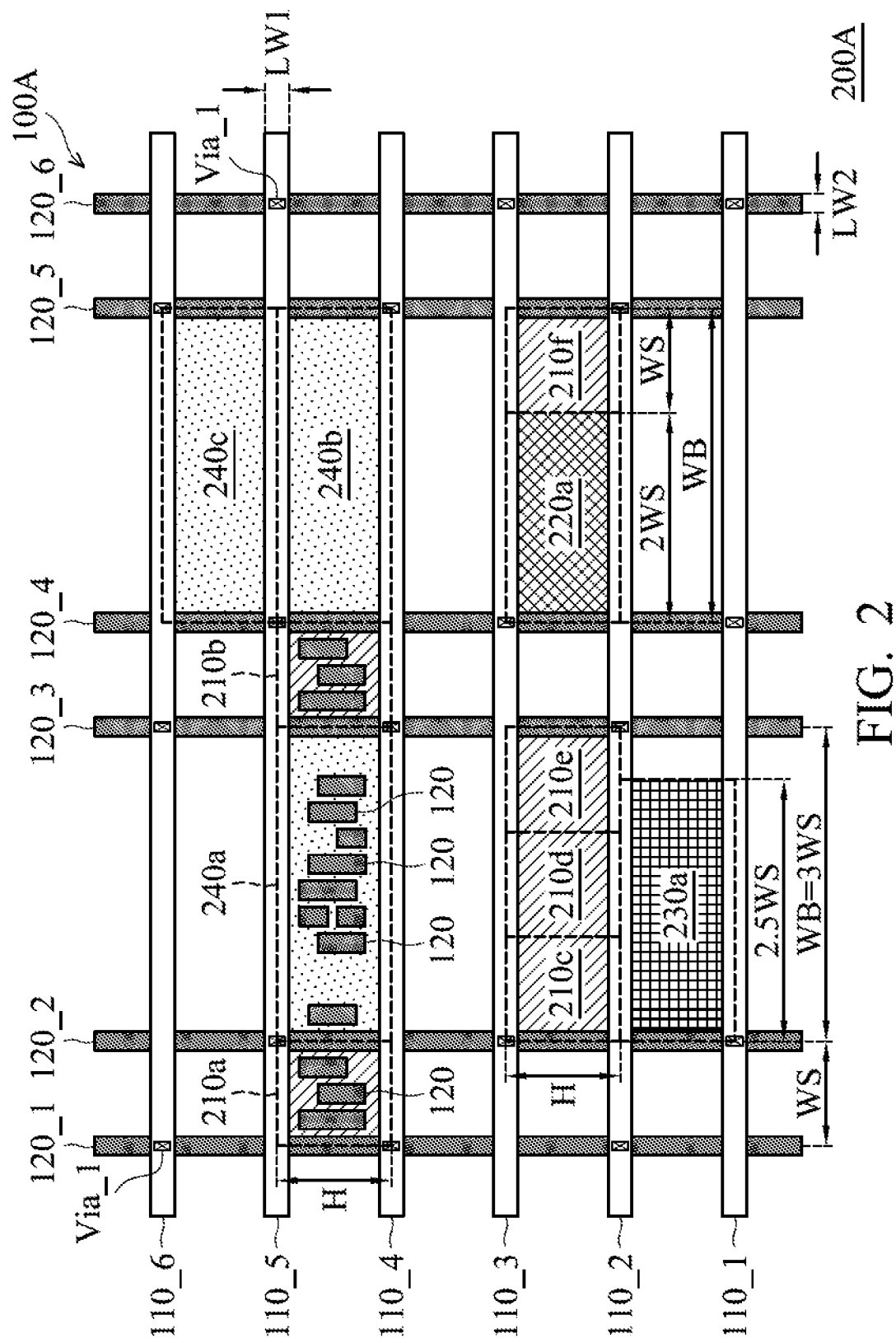
FIG. 2 shows an IC, in accordance with some embodiments of the disclosure.

FIG. 2 shows an IC 200A, in accordance with some embodiments of the disclosure. The IC 200A includes a power grid 100A of FIG. 1 and multiple standard cells. In some embodiments, the standard cells have the same height H in layout of the IC 200A. Furthermore, the power grid 100A is a non-uniform power delivery structure capable of delivering a supply voltage (VDD) and a grounding voltage (VSS) to the standard cells below the power grid 100A throughout the IC 200A.

In the IC 200A, the standard cells 210a through 210f are the standard cells having the smallest cell size in the IC 200A. The height of each of the standard cells 210a through 210f is H, and the width of each of the standard cells 210a through 210f is WS. Therefore, the power pitch WS of the power lines 120_1 and 120_2 is determined according to the width of the standard cells 210a through 210f having the smallest cell size. As described above, the power pitch between the power lines 120_1 and 120_2, the power pitch between the power lines 120_3 and 120_4, and the power pitch between the power lines 120_5 and 120_6 are the same.

In the IC 200A, the standard cell having the smallest cell size can be arranged or placed in a small pitch zone corresponding to the power pitch WS in a placement of the IC 200A. For example, the standard cell 210a is arranged or placed in a small pitch zone surrounded by the power lines 110_4, 110_5, 120_1 and 120_2, and the standard cell 210b is arranged or placed in a small pitch zone surrounded by the power lines 110_4, 110_5, 120_3 and 120_4.

In the IC 200A, the standard cells 240a through 240c are the standard cells having the biggest cell size in the IC 200A. The height of each of the standard cells 240a through 240c is also H, and the width of each of the standard cells 240a through 240c is WB, and WB is proportional to WS. Therefore, the power pitch WB of the power lines 120_2 and 120_3 is determined according to the width of the standard cells 240a through 240c having the biggest cell size. As described above, the power pitch between the power lines 120_2 and 120_3, and the power pitch between the power lines 120_4 and 120_5 are the same. In the power grid 100A, the ratio of WB to WS (WB/WS=3) is used as an example, and not to limit the disclosure.

In the IC 200A, the standard cell having the biggest cell size can be arranged or placed in a big pitch zone corresponding to the power pitch WB in the placement of the IC 200A. For example, the standard cell 240a is arranged or placed in a big pitch zone surrounded by the power lines 110_4, 110_5, 120_2 and 120_3, the standard cell 240b is arranged or placed in a big pitch zone surrounded by the power lines 110_4, 110_5, 120_4 and 120_5, and the standard cell 240c is arranged or placed in a big pitch zone surrounded by the power lines 110_5, 110_6, 120_4 and 120_5.

In some embodiments, the standard cell having the smallest cell size can be arranged or placed in a big pitch zone corresponding to the power pitch WB in a placement of the IC 200A. For example, the standard cells 210c, 210d and 210e are arranged or placed in a big pitch zone surrounded by the power lines 110_2, 110_3, 120_2 and 120_3.

In the IC 200A, the standard cell having a bigger cell size can be arranged or placed in the big pitch zone corresponding to the power pitch WB in a placement of the IC 200A. In some embodiments, the standard cell having a bigger cell size is individually placed in the big pitch zone corresponding to the power pitch WB. For example, the standard cell 230a is the standard cells having a bigger cell size in the IC 200A. The height of the standard cell 230a is H, and the width of the standard cell 230a is 2.5 WS. The standard cell 230a is arranged or placed in a big pitch zone surrounded by the power lines 110_1, 110_2, 120_2 and 120_3.

In some embodiments, the standard cell having a bigger cell size and the standard cell having the smallest cell size are both placed in the big pitch zone corresponding to the power pitch WB. For example, the standard cell 220a is the standard cells having a bigger cell size in the IC 200A, and the height of the standard cell 220a is H, and the width of the standard cell 220a is 2 WS. The standard cell 220a and the standard cell 210f are arranged or placed in a big pitch zone surrounded by the power lines 110_2, 110_3, 120_4 and 120_5.

By using the big pitch zone corresponding to the power pitch WB, it is more flexible to place the standard cells having various cell size, thereby providing enough space for cell placement.

In a uniform power delivery structure, some power lines of a uniform power grid are arranged with a fixed horizontal power pitch between the two adjacent power lines of different power in a higher metal layer (e.g. the metal layer $M_{n+1}$) in a horizontal direction. Furthermore, some power lines of the uniform power grid are arranged with a fixed vertical power pitch between the two adjacent power lines of different power in a lower metal layer (e.g. the metal layer $M_n$) in a vertical direction. For a standard cell having the biggest cell size, the metal lines or pads in the lower metal layer in the vertical direction may have placement conflicts or short with the power lines of the lower metal layer.

Compared with the uniform power delivery structure, for a standard cell having the biggest cell size in the power grid 100A, the metal line (or pad) 120 disposed in the metal layer $M_n$ will not electrically short the power lines surrounding the standard cell having the biggest cell size when the standard cell having the biggest cell size is arranged and placed in a big pitch zone. Specifically, there is no conflict with the power grid 100A when a placement process is performed to arrange or place the standard cell having the biggest cell size.

Figure 3:
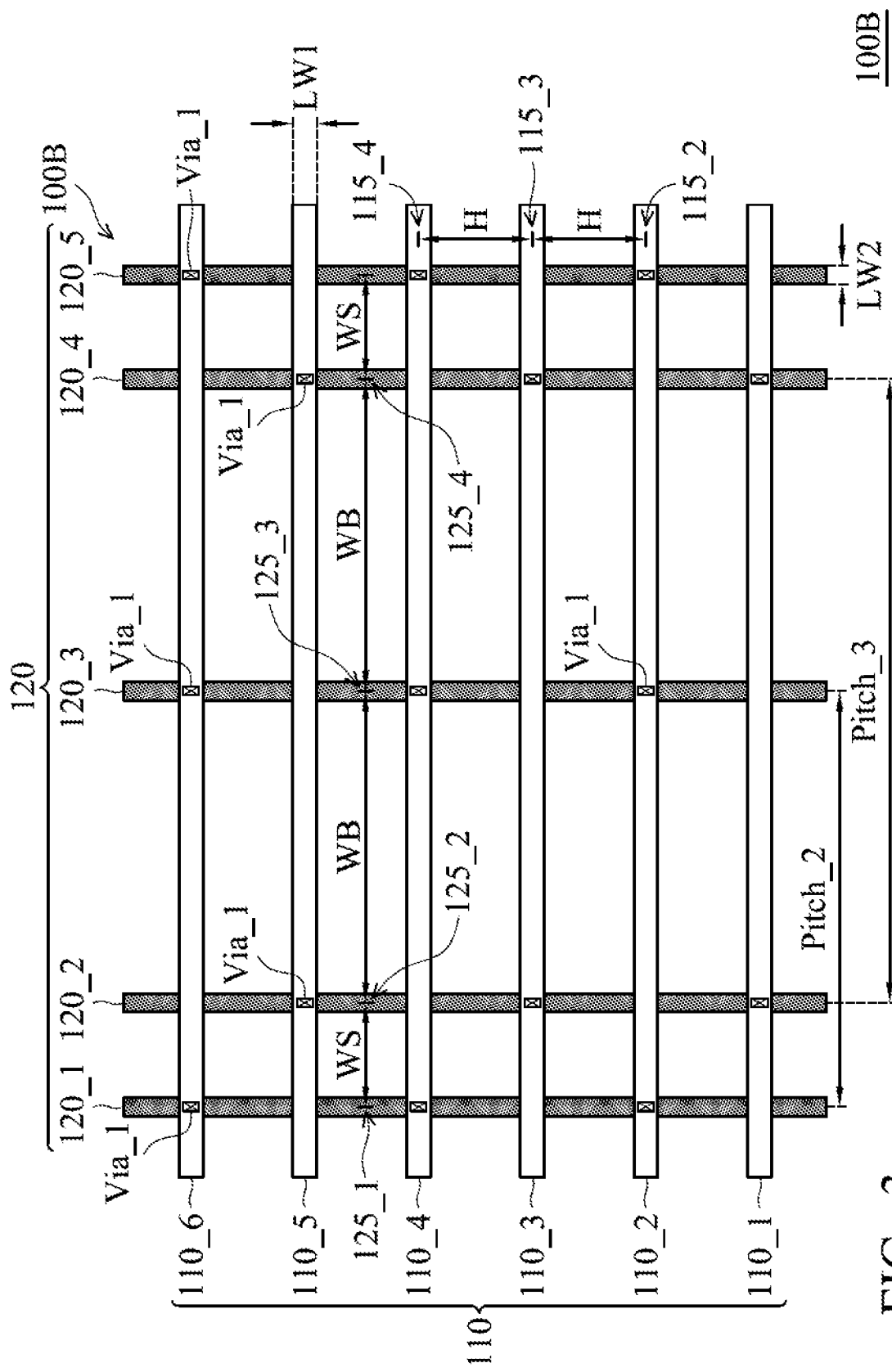
FIG. 3 shows a power grid of an IC, in accordance with some embodiments of the disclosure.

FIG. 3 shows a power grid 100B of an IC, in accordance with some embodiments of the disclosure. The power grid 100B is a non-uniform power delivery structure capable of delivering a supply voltage (VDD) and a grounding voltage (VSS) to multiple standard cells (or memory cells, logic cells, etc.) below the power grid 100B throughout the IC.

Multiple power lines (or traces) 120 are disposed in a metal layer Mn, and multiple power lines 110 are disposed in a metal layer $M_{n+1}$. As described above, the power lines 110 and 120 are used to deliver a first power, such as a supply voltage (e.g. VDD), and a second power, such as a grounding power (e.g. VSS).

In FIG. 3, the metal layer $M_{n+1}$ is disposed on the metal layer $M_n$. For example, the metal layer $M_{n+1}$ is an upper metal layer, and the metal layer $M_n$ is a lower metal layer. In some embodiments, the metal layer $M_n$ is disposed on the metal layer $M_{n+1}$, e.g. the metal layer $M_n$ is an upper metal layer, and the metal layer $M_{n+1}$ is a lower metal layer.

The power lines 110 are the metal lines arranged parallel to a horizontal direction, e.g. the power lines 110 are arranged in rows. The power lines 110 capable of delivering the first power and the power lines 110 capable of delivering the second power are alternately arranged in the metal layer $M_{n+1}$. Furthermore, the power lines 120 are the metal lines arranged parallel to a vertical direction, e.g. the power lines 120 are arranged in columns. The power lines 120 capable of delivering the first power and the power lines 120 capable of delivering the second power are alternately arranged in the metal layer $M_n$, i.e. the power lines 120 capable of delivering the first power and the power lines 120 capable of delivering the second power are interlaced.

Multiple vias Via_1 are coupled between the power lines 110 and 120, and the vias Via_1 are arranged between the metal layers $M_{n+1}$ and $M_n$. The power lines 110 and 120 capable of delivering the same power are coupled via the corresponding vias Via_1. For the first power, the power lines 110_1, 110_3 and 110_5 are coupled to the power lines 120_2, and 120_4 via the corresponding vias Via_1, so as to provide the first power to the standard cells of the IC. For the second power, the power lines 110_2, 110_4 and 110_6 are coupled to the power lines 120_1, 120_3 and 120_5 via the corresponding vias Via_1, so as to provide the second power to the standard cells of the IC.

In some embodiments, the power lines 110_1, 110_3 and 110_5 are coupled to the power lines 120_1, 120_3 and 120_5 via the corresponding vias Via_1, so as to deliver the first power. Furthermore, the power lines 110_2, 110_4 and 110_6 are coupled to the power lines 120_2, and 120_4 via the corresponding vias Via_1, so as to deliver the second power.

The power lines 110 have the same line width LW1. Furthermore, the distances from the center (e.g. in the half line width LW1) of each power line 110 to the centers of the two adjacent power lines 110 are the same and equal to the height H of the standard cells. Specific, each power line 110 is equidistant from the adjacent power lines 110. The placements of the standard cells will be described in detail below.

The power lines 120 have the same line width LW2. Furthermore, the distances from the center (e.g. in the half line width LW2) of each power line 120 to the centers of the two adjacent power lines 120 are different. For example, the distance from the center (label as 125_3) of the power line 120_3 to the center (label as 125_2) of the power line 120_2 is WB, and the distance from the center (label as 125_2) of the power line 120_2 to the center (label as 125_1) of the power line 120_1 is WS. Furthermore, the distance from the center (label as 125_3) of the power line 120_3 to the center (label as 125_4) of the power line 120_4 is WB, and the distance from the center (label as 125_4) of the power line 120_4 to the center (label as 125_5) of the power line 120_5 is WS. In some embodiments, WB is proportional to WS.

In the power grid 100B, a power pitch is the maximum allowable distance between two adjacent power lines. As described above, the power pitch between the two adjacent power lines 110 of different power is H, and the power pitch between the two adjacent power lines 110 of the same power is 2H. Specifically, the power pitches of the power lines 110 are the same.

For the power lines 120, the power pitch between the two adjacent power lines of different power may be WB or WS. For example, the power pitch between the power line 120_3 of the second power and the power line 120_2 of the first power is WB, and the power pitch between the power line 120_2 of the first power and the power line 120_1 of the second power is WS. Moreover, the power pitch between the power line 120_3 of the second power and the power line 120_4 of the first power is WB, and the power pitch between the power line 120_4 of the first power and the power line 120_5 of the second power is WS. Specifically, the distances from each power line 120 of one power to the two adjacent power lines of the other power may are different or the same.

In the power grid 100B, the power pitches between the two adjacent power lines 120 of the same power are different. For example, the power pitch between the power lines 120_1 and 120_3 of the second power is Pitch_2, and the power pitch Pitch_2 is the sum of WS and WB, i.e. Pitch_2=WS+WB. Furthermore, the power pitch between the power lines 120_2 and 120_4 of the first power is Pitch_3, and the power pitch Pitch_3 is the sum of WB and WB, i.e. Pitch_3=WB+WB.

In the power grid 100B, the metal lines 110 and 120 formed in the metal layers $M_n$ and $M_{n+1}$ are used as an example, and are not intended to limit the disclosure. In some embodiments, the power grid 100B is formed by more metal layers. Furthermore, the power grid 100B can periodically be implemented in the IC.

Figure 4:
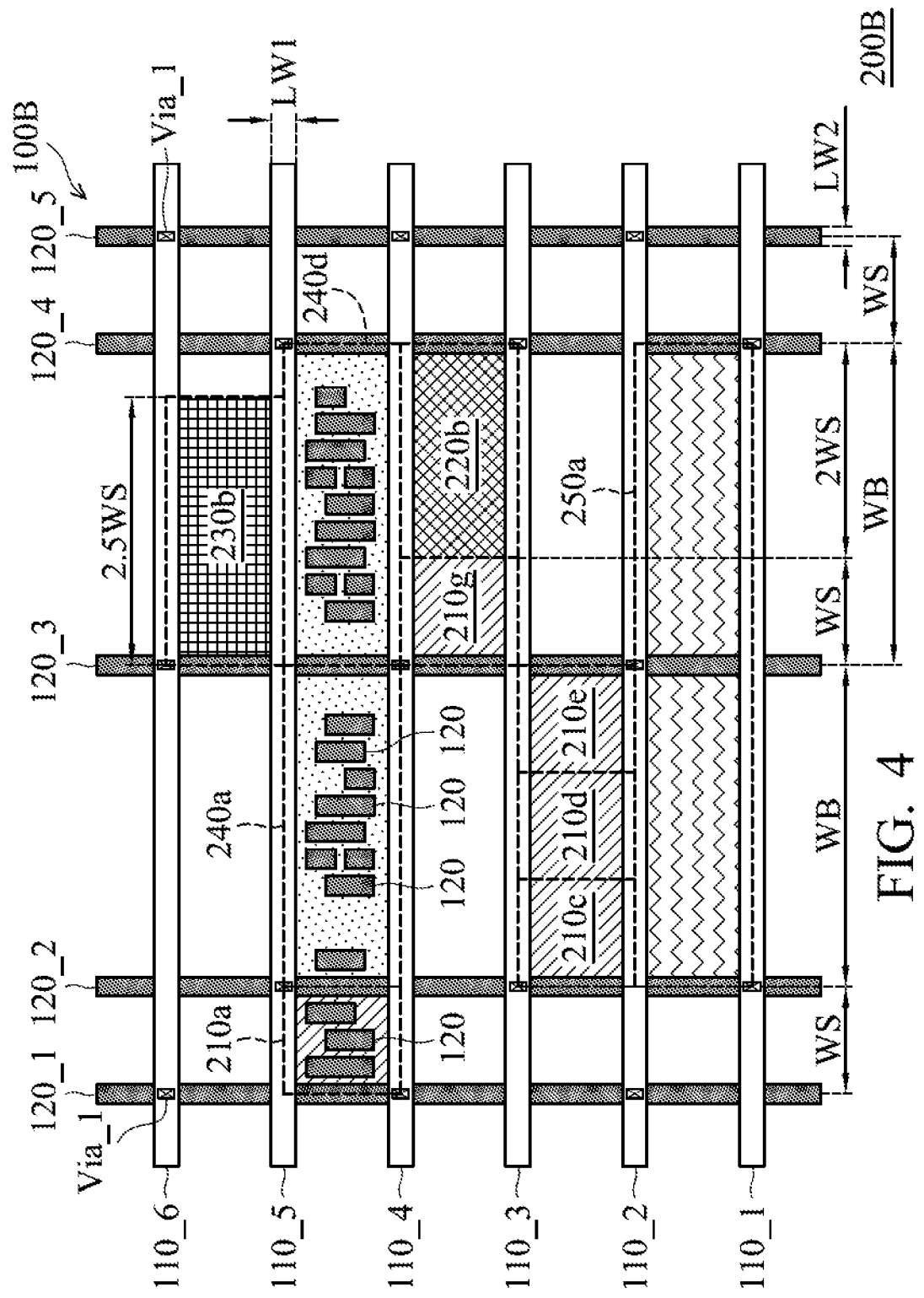
FIG. 4 shows an IC, in accordance with some embodiments of the disclosure.

FIG. 4 shows an IC 200B, in accordance with some embodiments of the disclosure. The IC 200B includes a power grid 100B of FIG. 3 and multiple standard cells. In some embodiments, the standard cells have the same height H in layout of the IC 200B. The power grid 100B is a non-uniform power delivery structure capable of delivering a supply voltage (VDD) and a grounding voltage (VSS) to the standard cells below the power grid 100B throughout the IC 200B.

In the IC 200B, the standard cells 210a, 210c through 210e and 210g are the standard cells having the smallest cell size. The height of each of the standard cells 210a, 210c through 210e and 210g is H, and the width of each of the standard cells 210a, 210c through 210e and 210g is WS. Therefore, the power pitch WS of the power grid 200B is determined according to the width of the standard cells 210a through 210e and 210g having the smallest cell size. As described above, the power pitch between the power lines 120_1 and 120_2, and the power pitch between the power lines 120_4 and 120_5 are the same.

In the IC 200B, the standard cell having the smallest cell size can be arranged or placed in a small pitch zone corresponding to the power pitch WS in a placement of the IC 200B. For example, the standard cell 210a is arranged or placed in a small pitch zone surrounded by the power lines 110_4, 110_5, 120_1 and 120_2.

In the IC 200B, the standard cells 240a and 240d are the standard cells having the biggest cell size. The height of each of the standard cells 240a and 240d is H, and the width of each of the standard cells 240a and 240d is WB, and WB is proportional to WS. As described above, the power pitch between the power lines 120_2 and 120_3, and the power pitch between the power lines 120_3 and 120_4 are the same. In the power grid 100B, the ratio of WB to WS (WB/WS=3) is used as an example, and not to limit the disclosure.

In the IC 200B, the standard cell having the biggest cell size can be arranged or placed in a big pitch zone corresponding to the power pitch WB in the placement of the IC 200B. For example, the standard cell 240a is arranged or placed in a big pitch zone surrounded by the power lines 110_4, 110_5, 120_2 and 120_3, and the standard cell 240b is arranged or placed in a big pitch zone surrounded by the power lines 110_4, 110_5, 120_3 and 120_4.

In some embodiments, a standard cell 250a is a standard cell having a cell size greater than the standard cells 240a and 240d, and the standard cell 250a is the standard cells having the biggest cell size in the IC 200B. The height of the standard cell 250a is H, and the width of the standard cell 250a is smaller than or equal to 2 WB and greater than WB (i.e. WB<250a≤2 WB). Furthermore, the standard cell 250a can be arranged or placed in two consecutive big pitch zone corresponding to the power pitch WB in the placement of the IC 200B. For example, the standard cell 250a is arranged or placed in the two big pitch zones surrounded by the power lines 110_1, 110_2, 120_2 and 120_4. In some embodiments, there are relatively few standard cells having a width greater than WB. Therefore, the big pitch zone is determined according to the power pitch WB since there are more standard cells having a width of WB. In some embodiments, the width of the standard cell having a biggest cell size is greater than or equal to WB and smaller than 2 WB (i.e. WB 250a<2 WB).

In some embodiments, the standard cell having the smallest cell size can be arranged or placed in a big pitch zone corresponding to the power pitch WB in the placement of the IC 200B. For example, the standard cells 210c, 210d and 210e are arranged or placed in a big pitch zone surrounded by the power lines 110_2, 110_3, 120_2 and 120_3.

In some embodiments, the standard cell having a bigger cell size is individually placed in the big pitch zone corresponding to the power pitch WB. For example, the standard cell 230b is the standard cell having a bigger cell size in the IC 200B. The height of the standard cell 230b is H, and the width of the standard cell 230b is 2.5 WS, and the standard cell 230b is arranged or placed in a big pitch zone surrounded by the power lines 110_5, 110_5, 120_3 and 120_4.

In some embodiments, the standard cell having a bigger cell size and the standard cell having the smallest cell size are both placed in the big pitch zone corresponding to the power pitch WB. For example, the standard cell 220b is the standard cell having a bigger cell size in the IC 200B, the height of the standard cell 220b is H, and the width of the standard cell 220b is 2 WS. The standard cell 220b and the standard cell 210g are arranged or placed in a big pitch zone surrounded by the power lines 110_3, 110_4, 120_3 and 120_4.

By using a big pitch zone corresponding to the power pitch WB, it is more flexible to place the standard cells having various cell size, thereby providing enough space for cell placement.

In a uniform power delivery structure, some power lines of a uniform power grid are arranged with a fixed horizontal power pitch between the two adjacent power lines of different power in a higher metal layer (e.g. the metal layer $M_{n+1}$) in a horizontal direction. Furthermore, some power lines of the uniform power grid are arranged with a fixed vertical power pitch between the two adjacent power lines of different power in a lower metal layer (e.g. the metal layer $M_n$) in a vertical direction. For a standard cell having the biggest cell size, the metal lines or pads in the lower metal layer in the vertical direction may have placement conflicts or short with the power lines of the lower metal layer.

Compared with the uniform power delivery structure, for a standard cell (e.g. 240a or 240d) having a bigger cell size in the power grid 100B, the metal line (or pad) 120 disposed in the metal layer $M_n$ will not electrically short the power lines surrounding the standard cell having the bigger cell size when the standard cell having the bigger cell size is arranged and placed in a big pitch zone. Similarly, for a standard cell (e.g. 250a) having the biggest cell size in the power grid 100B, the metal line (or pad) 120 disposed in the metal layer $M_n$ will not electrically short the power lines surrounding the standard cell having the biggest cell size when the standard cell having the biggest cell size is arranged and placed in two consecutive big pitch zones. Specifically, there is no conflict with the power grid 100B when a placement process is performed to arrange or place the standard cell having the biggest or a bigger cell size.

Figure 5:
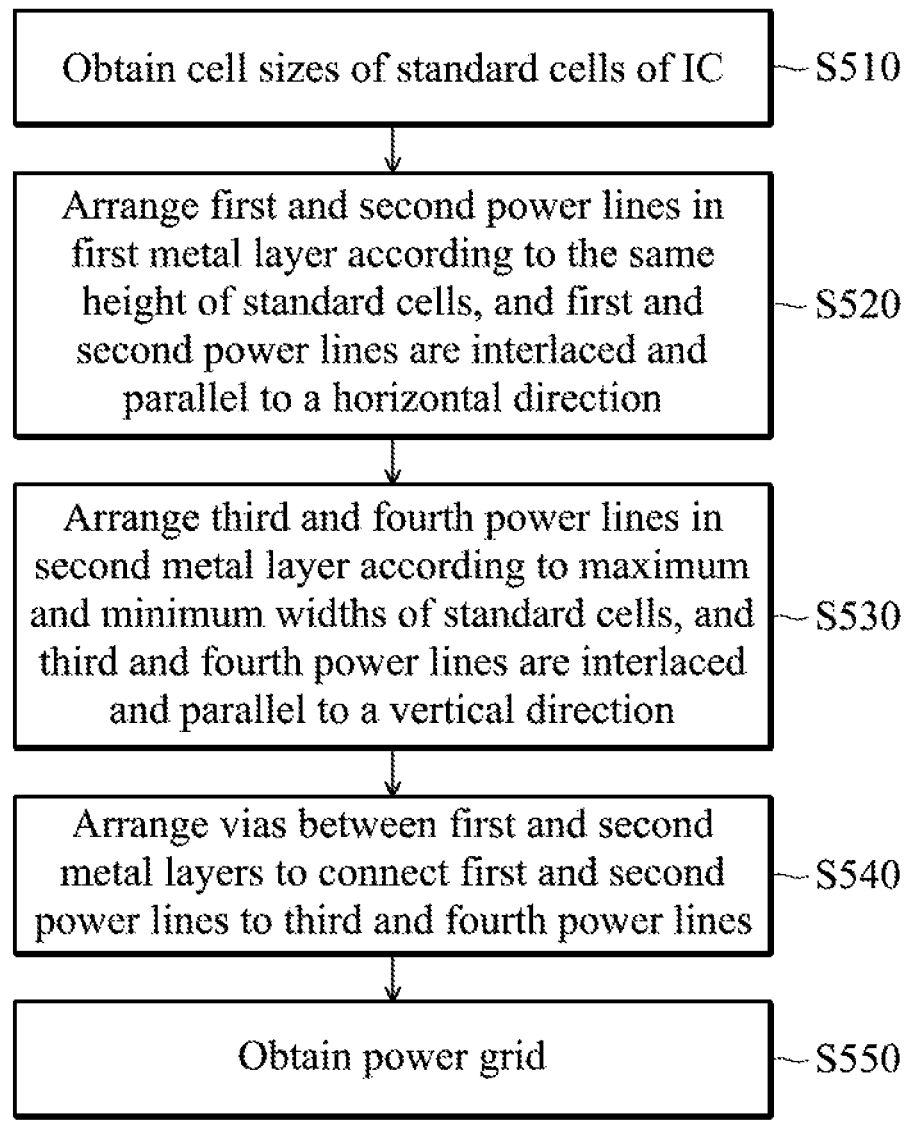
FIG. 5 shows a simplified flowchart illustrating a placement method for a power grid of an IC, in accordance with some embodiments of the disclosure.

FIG. 5 shows a simplified flowchart illustrating a placement method for a power grid of an IC, in accordance with some embodiments of the disclosure. In some embodiments, the placement method of FIG. 5 is performed by a processor capable of executing an electronic design automation (EDA) tool.

In operation S510, the cell sizes of multiple standard cells of the IC are obtained by the processor. The standard cells are the same height and have various widths.

In operation S520, multiple first power lines and multiple second power lines are arranged in a first metal layer by the processor, and the first and second power lines are interlaced and parallel to a horizontal direction. Furthermore, the first and second power lines are used to deliver different power, for example, a first power, such as a supply voltage (e.g. VDD), and a second power, such as a grounding power (e.g. VSS). In some embodiments, the distances from each first power line to the two adjacent second power lines are determined according to the heights of the standard cells, and the distances from each second power line to the two adjacent first power lines are determined according to the heights of the standard cells. Specifically, the power pitches between two adjacent power lines are fixed in the first metal layer.

In operation S530, multiple third power lines and multiple fourth power lines are arranged in a second metal layer by the processor, and the third and fourth power lines are interlaced and parallel to a vertical direction. Furthermore, the third and fourth power lines are used to deliver different power signals, for example, a first power, such as a supply voltage (e.g. VDD), and a second power, such as a grounding power (e.g. VSS). In some embodiments, the distances from each third power line to the two adjacent fourth power lines are determined according to the maximum and/or minimum widths of the standard cells, and the distances from each fourth power line to the two adjacent first power lines are determined according to the maximum and/or minimum widths of the standard cells. Specifically, the power pitches between two adjacent power lines may be the same or different in the second metal layer.

For example, for the power line 120_3 in the power grid 100B of FIG. 3, the power pitch between the power lines 120_2 and 120_3 is identical to the power pitch between the power lines 120_3 and 120_4. Therefore, the power pitches between two adjacent power lines are the same. For the power line 120_2 in the power grid 100B of FIG. 3, the power pitch between the power lines 120_2 and 120_1 is different from the power pitch between the power lines 120_2 and 120_3. Therefore, the power pitches between two adjacent power lines are different.

In operation S540, multiple vias Via_1 are arranged between the first and second metal layers by the processor, so as to connect the first and second power lines to the third and fourth power lines for delivering the first power and the second power. As described above, the power lines capable of delivering the same power are coupled via the corresponding vias. In some embodiments, the first metal layer is disposed on the second metal layer. In some embodiments, the second metal layer is disposed on the first metal layer.

In operation S550, a power grid is obtained by the processor, and the power grid is a non-uniform power delivery structure capable of delivering a supply voltage (VDD) and a grounding voltage (VSS) to the standard cells below the power grid throughout the IC.

As described above, after the power grid is formed, each standard cell is arranged or placed in a small pitch zone corresponding to the power pitch WS or a big pitch zone corresponding to the power pitch WB. Furthermore, the small or big pitch zone is surrounded by the individual first, second, third and fourth power lines.

Figure 6:
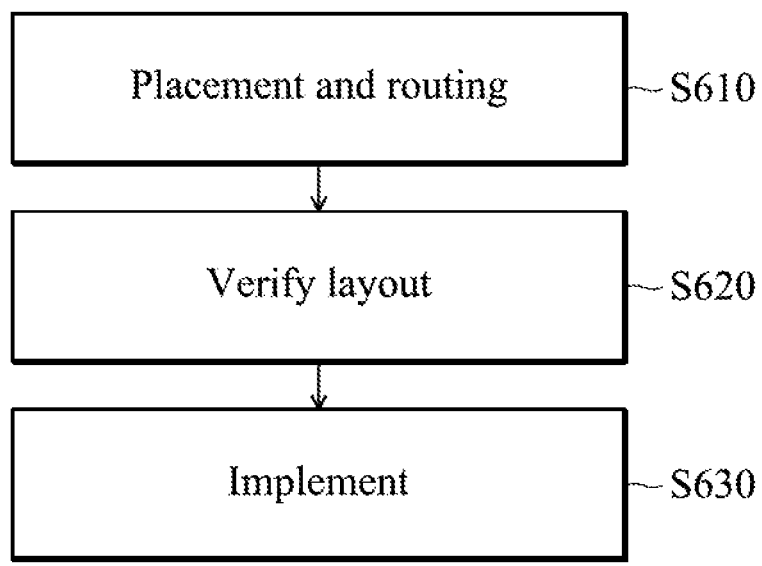
FIG. 6 shows a simplified flowchart illustrating a design process of an integrated circuit (IC), in accordance with some embodiments of the disclosure.

FIG. 6 shows a simplified flowchart illustrating a design process of an integrated circuit (IC), in accordance with some embodiments of the disclosure.

In operation S610, a placement and routing procedure is performed to generate a layout of the standard cells within a chip area of the IC. During the placement and routing procedure, the standard cells are arranged or placed in the layout based on the power grid obtained in operation S550. Furthermore, local and global connections needed to form the completed design using the standard cells are routed.

In operation S620, an analysis procedure is performed and the layout is verified to check whether the layout violates the various constraints or rules, for example, design rule checks, design rule verification, timing analysis, critical path analysis, static and dynamic power analysis, and so on.

In operation S630, if there are no violations in the layout, the IC is fabricated (or implemented) according to the layout. If a violation is present in the layout, the layout of the IC must be modified to handle the violation until no violations are present. For example, if no violation is present in the layout, a tape out process is performed to produce photomask generation data. This photomask generation (PG) data is then used to create the optical masks used to fabricate the semiconductor device in a photolithographic process at a wafer fabrication facility (FAB).

Figure 7:
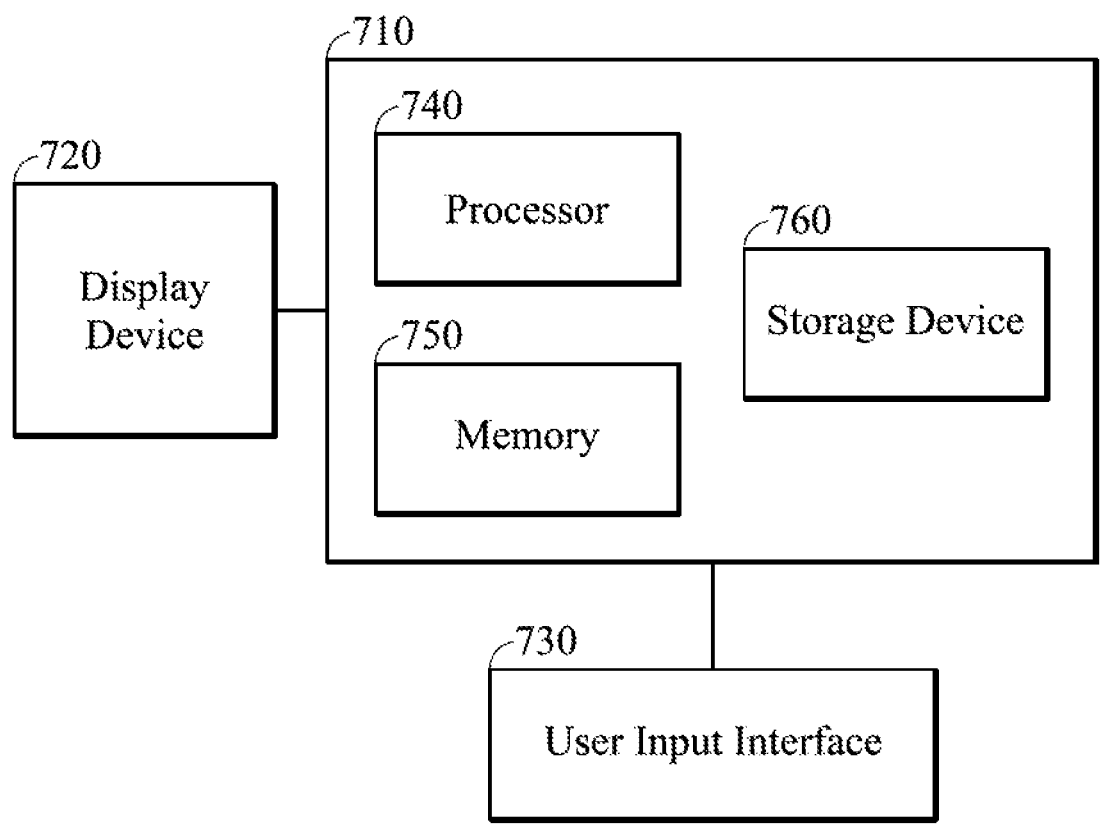
FIG. 7 shows a computer system, in accordance with some embodiments of the disclosure.

FIG. 7 shows a computer system 700, in accordance with some embodiments of the disclosure. The computer system 700 includes a computer 710, a display device 720 and a user input interface 730, wherein the computer 710 includes a processor 740, a memory 750, and a storage device 760. The computer 710 is coupled to the display device 720 and the user input interface 730, wherein the computer 710 is capable of operating an electronic design automation (EDA) tool to perform the placement method of FIG. 5. Furthermore, the computer 710 is capable of receiving the information regarding the layout of the IC and displaying the features in the layout, and nodes corresponding to the features of the layout in a graph on the display device 720. In some embodiments, the display device 720 is a GUI for the computer 710. Furthermore, the display device 720 and the user input interface 730 can be implemented in the computer 710. The user input interface 730 may be a keyboard, a mouse and so on. In the computer 710, the storage device 760 can store the operating systems (OSs), applications, and data that include input required by the applications and/or output generated by applications. The processor 740 of the computer 710 can perform one or more operations (either automatically or with user input) in any method that is implicitly or explicitly described in this disclosure. Furthermore, during operation, the processor 740 can load the applications of the storage device 760 into the memory 750, and then the applications can be used to create, view, and/or edit the related layouts for IC design.

Embodiments for the non-uniform power delivery structures of IC are provided. In the power grid of the non-uniform power delivery structure, a small pitch zone corresponding to the power pitch WS is used to place a standard cell having the smallest cell size. Furthermore, a big pitch zone corresponding to the power pitch WB is used to place a standard cell having the biggest or bigger cell size or multiple standard cells having the smallest cell size. Furthermore, by using a big pitch zone corresponding to the power pitch WB, it is more flexible to place the standard cells having various cell size, thereby providing enough space for cell placement. Moreover, there is no conflict with the power grid when a placement process is performed to arrange or place the standard cell having the biggest or a bigger cell size.

In some embodiments, a power grid of an integrated circuit (IC) is provided. The power grid includes a plurality of first power lines, a plurality of second power lines, a plurality of third power lines and a plurality of fourth power lines. The plurality of first power lines are formed in a first metal layer. The plurality of second power lines are formed in the first metal layer and parallel to the first power lines, and the first and second power lines are interlaced in the first metal layer. The plurality of third power lines formed in a second metal layer, and the third power lines are perpendicular to the first power lines. The plurality of fourth power lines are formed in the second metal layer and parallel to the third power lines, and the third and fourth power lines are interlaced in the second metal layer. Distances from each of the third power lines to two adjacent fourth power lines are different, and distances from each of the fourth power lines to two adjacent third power lines are the same.

In some embodiments, an integrated circuit (IC) is provided. The IC includes a power grid, a first standard cell, a second standard cell, and a third standard cell. The power grid includes a plurality of power lines arranged in a plurality of rows and a plurality of columns. The first standard cell is surrounded by a first row, a second row, a first column, and a second column of the power lines, and has a first height and a first width in a placement of the IC. The second standard cell is surrounded by the first row, the second row, the second column, and a third column of the power lines, and has the first height and a second width in the placement. The second width is greater than the first width. The third standard cell is surrounded by the first row, the second row, the third column, and a fourth column of the power lines, and has the first height and the second width in the placement. The second column is disposed between the first and third columns, and the third column is disposed between the second and fourth columns. The second width is an integer multiple of the first width.

In some embodiments, a method for placing a power grid of an integrated circuit (IC) is provided. Cell sizes of a plurality of standard cells of the IC are obtained, and the standard cells have the same height. A plurality of first power lines and a plurality of second power lines are arranged in a first metal layer of the power grid, and the first and second power lines are interlaced and parallel to a horizontal direction. A plurality of third power lines and a plurality of fourth power lines are arranged in a second metal layer of the power grid, and the third and fourth power lines are interlaced and parallel to a vertical direction. The IC is fabricated according to a layout corresponding to the power grid and the standard cells. Distances from each of the first power lines to two adjacent second power lines are determined according to the heights of the standard cells, and distances from each of the third power lines to two adjacent fourth power lines are different, and distances from each of the fourth power lines to two adjacent third power lines are the same. At least one of the steps of the method is performed by a processor.

The foregoing outlines nodes of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A power grid of an integrated circuit (IC), comprising:
a plurality of first power lines formed in a first metal layer;
a plurality of second power lines formed in the first metal layer and parallel to the first power lines, wherein the first and second power lines are interlaced in the first metal layer;
a plurality of third power lines formed in a second metal layer, wherein the third power lines are perpendicular to the first power lines; and
a plurality of fourth power lines formed in the second metal layer and parallel to the third power lines, wherein the third and fourth power lines are interlaced in the second metal layer, wherein distances from each of the third power lines to two adjacent fourth power lines are different, and distances from each of the fourth power lines to two adjacent third power lines are the same.

2. The power grid as claimed in claim 1, wherein the first and third power lines are coupled to each other and configured to deliver a first power, and the second and fourth power lines are coupled to each other and configured to deliver a second power that is different from the first power.

3. The power grid as claimed in claim 1, wherein the first and fourth power lines are coupled to each other and configured to deliver a first power, and the second and third power lines are coupled to each other and configured to deliver a second power that is different from the first power.

4. The power grid as claimed in claim 1, wherein a first power pitch between two adjacent third power lines is greater than a second power pitch between two adjacent fourth power lines.

5. The power grid as claimed in claim 1, wherein the IC comprises a plurality of standard cells, and the standard cells have a height.

6. The power grid as claimed in claim 5, wherein a third power pitch between two adjacent first power lines and a fourth power pitch between two adjacent second power lines are equal to twice the height of the standard cells.

7. The power grid as claimed in claim 5, wherein a distance between the first power line and the adjacent second power line is equal to the height of the standard cells.

8. The power grid as claimed in claim 5, wherein a first distance between a third power line and one of the two adjacent fourth power lines is determined according to a first width of the standard cell having a smallest cell size, and a second distance between the third power line and another adjacent fourth power line is determined according to a second width of the standard cell having a biggest cell size.

9. The power grid as claimed in claim 5, wherein a first distance between a third power line and one of the two adjacent fourth power lines is determined according to a first width of the standard cell having a smallest cell size, and a second distance between the third power line and another adjacent fourth power line is determined according to half of a second width of the standard cell having a biggest cell size.

10. An integrated circuit (IC), comprising:
a power grid comprising a plurality of power lines arranged in a plurality of rows and a plurality of columns;
a first standard cell surrounded by a first row, a second row, a first column, and a second column of the power lines, having a first height and a first width in a placement of the IC;
a second standard cell surrounded by the first row, the second row, the second column, and a third column of the power lines, having the first height and a second width in the placement, wherein the second width is greater than the first width; and
a third standard cell surrounded by the first row, the second row, the third column, and a fourth column of the power lines, having the first height and the second width in the placement;
wherein the columns of the power lines further comprise a fifth column,
wherein the second column is disposed between the first and third columns, the third column is disposed between the second and fourth columns, and the fourth column is disposed between the third and fifth columns,
wherein distances between the second column and the first column and between the second column and the third column are different, distances between the fourth column and the third column and between the fourth column and the fifth column are different, and the distances between the third column and the second column and between the third column and the fourth column are the same,
wherein the second width is an integer multiple of the first width.

11. The IC as claimed in claim 10, wherein a distance between the first and second row is equal to the first height.

12. The IC as claimed in claim 10, further comprising:
a plurality of fourth standard cells surrounded by the second row, a third row, the second column, and the third column of the power lines, each having the first height and the first width in the placement.

13. The IC as claimed in claim 10, further comprising:
a fifth standard cell surrounded by the first row, the second row, the fourth column, and the fifth column of the power lines, having the first height and the first width in the placement.

14. The IC as claimed in claim 10, further comprising:
a fourth standard cell surrounded by the second row, a third row, the third column and the fourth column of the power lines, having the first height and a third width in the placement,
wherein the third width is greater than the first width and less than the second width.

15. The IC as claimed in claim 10, wherein the first row, the second column and the fourth column of the power lines are coupled to each other and configured to deliver a first power, and the second row, the first column and the third column of the power lines are coupled to each other and configured to deliver a second power that is different from the first power.

16. The IC as claimed in claim 10, wherein the rows of the power lines are formed in a first metal layer and the columns of the power lines are formed in a second metal layer.

17. A method for placing a power grid of an integrated circuit (IC), comprising:
obtaining cell sizes of a plurality of standard cells of the IC, wherein the standard cells have the same height;
arranging a plurality of first power lines and a plurality of second power lines in a first metal layer of the power grid, wherein the first and second power lines are interlaced and parallel to a horizontal direction;
arranging a plurality of third power lines and a plurality of fourth power lines in a second metal layer of the power grid, wherein the third and fourth power lines are interlaced and parallel to a vertical direction; and
fabricating the IC according to a layout corresponding to the power grid and the standard cells,
wherein distances from each of the first power lines to two adjacent second power lines are determined according to the heights of the standard cells, and distances from each of the third power lines to two adjacent fourth power lines are different, and distances from each of the fourth power lines to two adjacent third power lines are the same,
wherein at least one of the steps of the method is performed by a processor.

18. The method as claimed in claim 17, further comprising:
arranging a plurality of first vias between the first and second metal layers to connect the first and third power lines; and arranging a plurality of second vias between the first and second metal layers to connect the second and fourth power lines.

19. The method as claimed in claim 17, further comprising:
arranging a plurality of third vias between the first and second metal layers to connect the first and fourth power lines; and
arranging a plurality of fourth vias between the first and second metal layers to connect the second and third power lines.

20. The method as claimed in claim 17, wherein a first power pitch between two adjacent third power lines is greater than a second power pitch between two adjacent fourth power lines.

* * * * *